United States Patent

[11] 3,626,095

[72] Inventors Yukio Nakagome;
Yasuo Fukata, both of Tokyo-to, Japan
[21] Appl. No. 824,908
[22] Filed May 15, 1969
[45] Patented Dec. 7, 1971
[73] Assignee Kokusai Denshin Denwa Kabushiki Kaisha
Tokyo-to, Japan
[32] Priority May 18, 1968
[33] Japan
[31] 43/33398

[54] REGENERATING REPEATING SYSTEM FOR START-STOP TELEGRAPH SIGNALS

3 Claims, 6 Drawing Figs.

[52] U.S. Cl. 178/70 R
[51] Int. Cl. H04l 25/52
[50] Field of Search 178/70 R; 179/15 A, 15 AD, 15 BW

[56] References Cited
UNITED STATES PATENTS

| | | | |
|---|---|---|---|
| 3,153,701 | 10/1964 | Oshima et al. | 179/15 AP |
| 3,396,239 | 8/1968 | Yamauchi | 178/70 X |
| 3,502,806 | 3/1970 | Townsend | 179/15 BW |

*Primary Examiner*—Kathleen H. Claffy
*Assistant Examiner*—William A. Helvestine
*Attorneys*—Robert E. Burns and Emmanuel J. Lobato

ABSTRACT: Disclosed herein is a regenerative repeating system for start-stop serial telegraph signals of a plurality of channels by the use of a time-divisional serial-parallel signal converter and a time-divisional parallel-serial converter connected to the serial-parallel converter through a data processor, in which control information is transferred from the serial-parallel converter to the parallel-serial converter to determine time-divisionally durations of stop elements of the start-stop telegraph signals so that the duration of each stop element is equal to one of a plurality of predetermined durations which correspond respectively to divided $n$ parts of the remainder of the regular duration of the stop element except a minimum duration determined so as to secure normal reception of the stop element, where $n$ is a positive integer.

REGENERATING REPEATING SYSTEM FOR START-STOP TELEGRAPH SIGNALS

This invention relates to a regeneration repeating system for start-stop telegraph signals and more particularly to a regenerative repeating system which performs serial-parallel conversion of serial start-stop telegraph signals of input channels to carry out processing (e.g., switching) of converted parallel signals and parallel-serial conversion of the processed parallel signals to send out to the output channels, thereby, enabling switching of the start-stop telegraph signals.

Conventional data switching systems are usually storing-and-exchanging systems (i.e., store and forward systems) each of which comprises a data processor, such as computer, and a communication control unit having a serial-parallel conversion means and a parallel-serial signal conversion means for the signals. In other words, a sufficient memory capacity is provided in the computer to store the signals data received block after block in a predetermined manner, such as in a characterwise manner or messagewise manner, and the signals processed in a block as mentioned above are sent out to the output channels. This system is employed in a case where a delay time is permissible between receiving the data signals and sending out them. In this storing-and-exchanging system even, if the telegraph speed of the input channel increases in comparison with the speed of the output channel, overflow of data does not occur in the system since sufficient memory capacity in the processor is provided.

However, in a direct switching system, such as a teletypewriter exchange system such a long delay time from receiving the data to sending same out is not allowable. Therefore, a direct switching memory does not require a large capacity memory, since the memory is employed only for serial-parallel and parallel-serial signal conversion. In a case where the direct switching system is formed by a combination of a computer and a communication control unit, if the telegraph speed of each input and output data channel is equal to a normal speed, mass-memory means are not necessary in the computer to store the overflow data caused by a speed difference between input and output telegraph signals. However, since the telegraph speed of each input data channel will be usually fluctuated by the fluctuation of revolutions or the play of a synchronous motor used in an automatic data transmitter or receiver or by telegraph distortion etc., the duration of each received character is not always exactly equal to the normal duration (e.g., 150 milliseconds). If the duration of each received character is shorter than that of each output character, overflow of data is caused for a long operating time so that the received data will be lost in the system in a case where there is no storage of the received data in the computer.

An object of this invention is to provide a regenerative repeating system for start-stop telegraph signals capable of processing and repeating the start-stop telegraph signals information of a plurality of input channels in a real-time manner without storing the digital information in a data processor even if the telegraph speed of each channel fluctuates and the duration of each received character is shorter than that of each output character.

In accordance with a feature of this invention, detection means for detecting, as character-duration information, the duration of each of the received characters is provided at an input serial-parallel converter of a communication control unit to transfer the character-duration information to an output parallel-serial converter of the communication control unit through a data processor together with the received characters, so that the duration of each of the characters to be transmitted to the respective output channels is determined in the output parallel-serial converter in accordance with the transferred information.

In accordance with another feature of this invention, control information indicative of the number of occupied or unoccupied bits of a memory in an input serial-parallel converter of a communication control unit is transferred to an output parallel-serial converter of the communication control unit through a data processor together with the received characters, so that the duration of each of the characters to be transmitted to the respective output channels is determined in the output parallel serial converter in accordance with the transferred control information and the number of remaining sent-out elements of the sending out character.

The above operation is performed time-divisionally for a plurality of channels coupled with this system.

The principle of this invention will be better understood from the following more detailed discussion taken in conjunction with the accompanying drawings, in which the same or equivalent parts are designated by the same reference numerals, characters and symbols, and in which.

Figure 1:
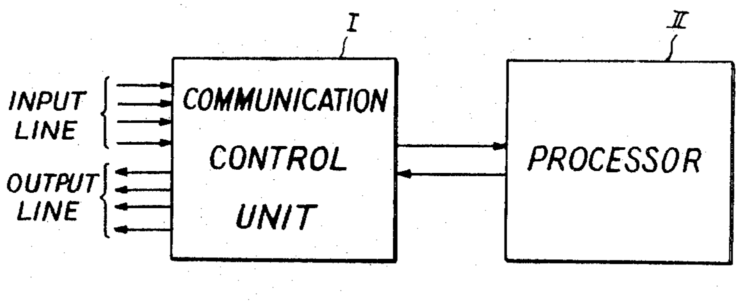
FIG. 1 is a block diagram for illustrating the general construction of the system of this invention.

With reference to FIG. 1, the general construction of the system of this invention will be described. A plurality of input lines each for a start-stop serial telegraph signal are connected to a communication control unit I, in which a serial-parallel signal converter known per se and a parallel-serial signal converter known per se are provided. (See, U.S. Pat. No. 3,516,074 U.S. Pat. application Ser. No. 678,260 filed on Oct. 26, 1967, and British Pat. No. 1,168,086). The serial-parallel signal converter converts time-divisionally the serial telegraph signals (hereinafter called "serial signal") of the input lines to parallel telegraph signals (hereinafter called "parallel signals") in a characterwise manner. The parallel-serial signal converter converts time-divisionally parallel signals to serial signals of the respective output lines in a characterwise manner. A data processor II known per se is connected to the communication control unit I to receive and switch the converted parallel signals from the serial-parallel signal converter so as to apply them, after processing or switching in the processor II if necessary, to the parallel-serial signal converter as the parallel signals to be converted to the serial signals of the respective output lines.

Figure 2A:
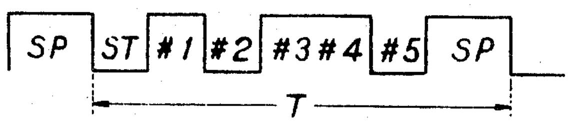
FIGS. 2A, 2B and 2C are signal configurations of start-stop telegraph signals explanatory of the operation of the system of this invention.
Figure 2B:
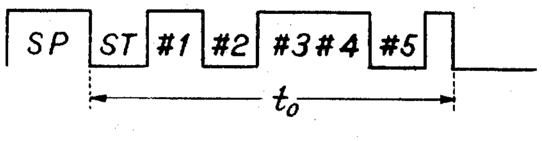
Figure 2C:
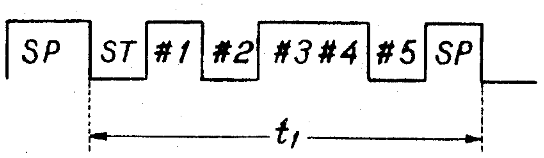

This operation of the system of this invention will be described in taking a five-unit start-stop telegraph signal as an example of the input signal. FIG. 2A shows a telegraph signal of this type having a standard character duration T. This telegraph signal is formed successively by a start element ST, information bits No. 1, 2, 3, 4, and 5, and a stop element SP. The regular duration of the stop element SP is equal to 1.5 times the normal duration of each of other elements, ST, 1, 2, 3, 4, and 5, as illustrated in FIG. 2A. To secure the normal reception of the stop elements of the start-stop telegraph signals the minimum duration of the stop element SP is necessarily longer than one-third of its regular said duration. In abnormal condition, a character shown in FIG. 2A can be correctly received. However, since the modulation rate of the received telegraph signal is slightly fluctuated due to deviation of the speed of a motor in a transmitter of the system, the duration of each received character is usually deviated from a standard character duration (T). These deviated waveforms are not shown in FIGS. 2A, 2B and 2C. To avoid overflow of received telegraph signals in the system, it is desirable to adjust the duration of each output character to the duration of each received character. For obtaining each output telegraph signal of suitable character duration in response to each received telegraph signal, in this invention, the remainder (i.e.; two-thirds) of the regular duration of the stop element SP is divided into $n$ equal parts; where $n$ is a positive integer. FIGS. 2A, 2B, and 2C show an example of the case where the remainder is divided into two equal parts (i.e.; three duration) to provide three different durations $t_0$, $t_1$ and T, so that the minimum duration, the medium duration and the maximum duration (i.e.; regular duration) of a character correspond respectively to durations $t_0$, $t_1$ and T as shown.

Figure 3:
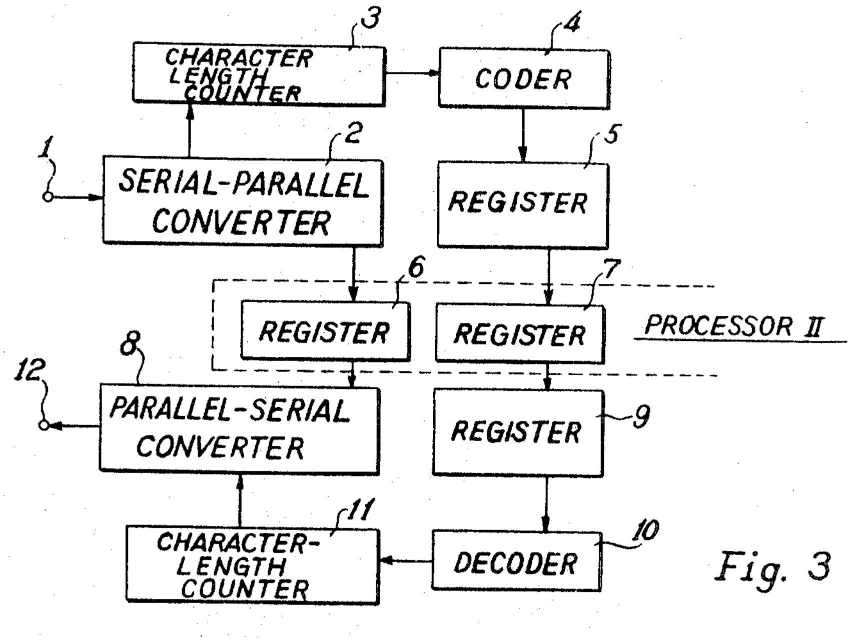
FIGS. 3 and 4 are block diagrams each for illustrating embodiment of this invention.

With reference to FIG. 3, an example of this invention will be described below. The system of this invention operates time-divisionally to handle the telegraph signals of a plurality of channels. However, the construction and operation of the system of this invention will be described only for a single channel for simplicity of explanation and the principal of time-divisional operation will be readily understood from the operation of the single channel. In the example shown in FIG. 3, the start-stop serial telegraph signal of an input channel is applied to an input terminal 1. A serial-parallel signal converter 2 comprises, as known per se, (as disclosed in U.S. Pat. No. 3,516,074) a counter (called an "element counter") counting the number of elements of the serial telegraph signal received, a counter (called a "sampling pulse counter") counting the number of sampling pulses for each of the signal elements, a serial shift register storing in shifting element by element the successive bits of a character of the received serial signal, and a parallel register storing temporarily the start-stop telegraph signals formed into a character in the serial shift register. A counter (called a "character length counter") 3 counts pulses generated in this means 3 or applied from an external means to measure the interval between adjacent characteristic instants from the stop element SP to the start element ST. This measurement of the interval (i.e.; the duration of a character) is stopped if a duration from a characteristic instant (from a stop element SP to a start element ST) exceeds the regular duration T of the character. The measured result of the character length counter 3 is transferred to a coder 4, and the counting state of the character length counter 3 is thereafter reset to an initial state. The coder 4 encodes the measured result transferred from the character length counter 3 in accordance with the condition where the character duration $t$ measured is equal to or larger than the regular character duration T (condition I), or included in a region between the durations T and $t_1$ (condition II) or included in a region between the durations $t_1$ and $t_0$ (condition III). In general, the number of these conditions is equal to a number $(n+1)$ in the case where the remainder (two-thirds) of the regular duration of the stop element SP is divided into $n$ equal parts as mentioned before. The character duration information coded by the coder 4 is temporarily stored in a register 5. A processor II is accessible to the serial-parallel signal converter 2 and the register 5 at intervals each of which is shorter than the minimum duration $t_0$. If a character has been completely stored in the parallel signal converter 2 of the serial-parallel register (mentioned above), the contents of the parallel register and the register 5 are respectively transferred at the access time to registers 6 and 7 provided in the processor II.

On the other hand, a parallel-serial signal converter 8 known per se (as disclosed in U.S. Pat. No. 3,516,074) comprises a parallel register (storing temporarily the parallel bits of the character transferred from the register 6), a serial shift register storing in shifting bit by bit the parallel bits transferred from the parallel register to convert the parallel bits to a serial character, a counter (called an "element counter") counter counting the number of sent-out elements of the character which is being sent out from the serial shift register, and a counter (called an "element-length counter") measuring the duration of each of the elements of the sending out character. At intervals shorter than the minimum duration $t_0$, the parallel register of the parallel-serial signal converter 8 receives the parallel bits of the character from the register 6, and a register 9 receives the contents of the register 7. The character duration information transferred as mentioned above from the coder 4 and through the registers 5, 7 and 9 is decoded at a decoder 10. The decoded information is indicative of the duration of the character to be sent out and is set in a counter (called a "character length counter") 11. In other words, numerical information indicative of the duration T, $t_1$ or $t_0$ is set in the character length counter 11 in accordance with the forementioned conditions I, II, III respectively. The element-length counter provided in the parallel-serial converter 8 determines the duration of the stop element SP of a sending out character under control of the character length counter 11, so that the duration of the sending out character is equal to the duration (T, $t_1$ or $t_0$) determined in accordance with the conditions (I, II, III) of the input character.

The above operations are repeated for each of the input characters. The processor II performs the necessary processing of the parallel character signal stored in the register 6. A serial signal converted at the parallel-serial converter is applied from the parallel-serial converter 8 to an output terminal 12.

Figure 4:
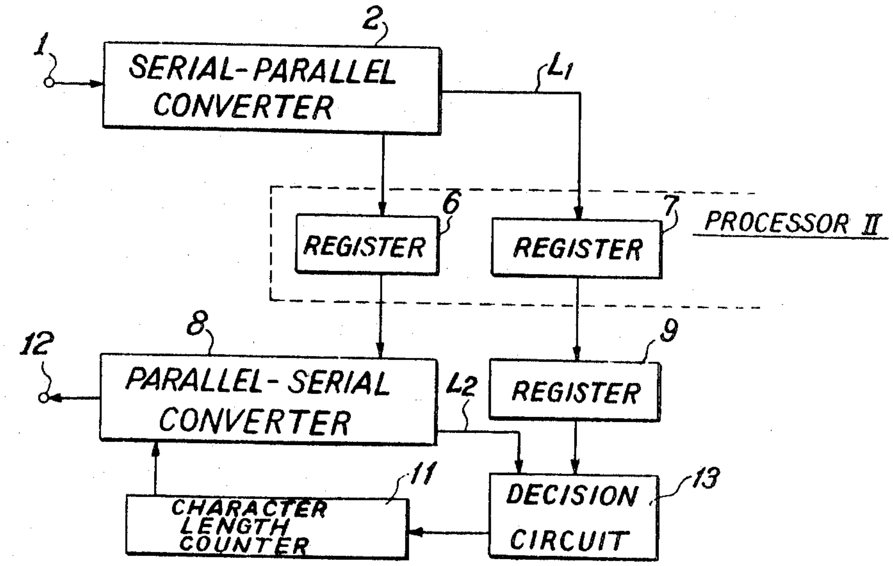

With reference to FIG. 4, another example of this invention will be described. In this example, the contents of the element counter of the serial-parallel converter 2 is transferred to the register 7 as control information indicative of the number of stored bits of the element counter. This control information is then transferred through the register 9 to a decision circuit 13. The contents of the element counter provided in the parallel-serial signal converter so as to indicate the number of remaining bits are also applied to the decision circuit 13. This decision circuit 13 determines numerical information in accordance with the applied two inputs. The numerical information is set in the character length counter 11 so as to determine the duration of the sending out character. For example, the duration $t_0$, $t_1$ or T is determined by determining the numerical information in the decision circuit 13 in accordance with conditions where the total number of two inputs of the decision circuit 13 is larger than 5 (conditions I$a$), or equal to 5 (condition II$a$) or less than 5 (condition III$a$ ) respectively.

If the control information transferred from the serial-parallel converter 2 indicates the number of empty bits of the element counter, the duration T, $t_1$ or $t_0$ is determined in accordance with the conditions I$a$, II$a$, III$a$ respectively.

The number of bits of the control information may be reduced to one bit by coding the numbers of bits 0, 1, and 2 to a binary number "0" and the numbers of bits 3, 4 and 5 to a binary number "1" respectively by way of example. In this case, coders for performing this coding are inserted in paths $L_1$ and $L_2$ respectively. Moreover, the duration of the sending out character is determined in accordance with conditions where the two inputs of the decision circuit 13 assumes states "00" (condition I$b$), "01 or 10" condition II$b$) and "11" (condition III$b$). If the control information is indicative of the stored bits of the element counter of the serial-parallel converter 2, the duration T, $t_1$ or $t_0$ of the sending out character is determined in accordance with the conditions I$b$, II$b$ and III$b$ respectively by way of example.

As mentioned above, repeating of digital information of a plurality of channels can be time-divisionally performed in a real time manner without overflow or loss of information even if the telegraph speed of each channel fluctuated. This invention may be applied to switching of telegraph or data signals as well as regenerative repeating thereof.

What we claim is:

1. A regenerative repeating system for start-stop telegraph signals comprising: a serial-parallel signal converter having a plurality of input channels receptive during use of the system of serial start-stop telegraph signals and operative to time-divisionally convert the serial start-stop telegraph signals to parallel telegraph signals each having a parallel-signal configuration; data processing means connected to said serial-parallel signal converter for time-divisionally transferring the parallel telegraph signals; means including a parallel-serial signal converter connected to said data processing means operative to time-divisionally convert the transferred parallel telegraph signals to serial start-stop telegraph signals to be sent out to a plurality of output channels, and a character length counter for time-divisionally determining the duration of each of the characters of the serial-telegraph signals to be sent out to said output channels; and means for transferring control information from said serial-parallel signal converter to the character length counter through the data processor to enable said parallel-serial signal converter to time-divisionally regenerate information bits of the start-stop telegraph signals at a telegraph speed nearly equal to that of the serial start-stop telegraph signals of said input channels and to time-divisionally determine the duration of the stop element of each of the output characters in consideration of the control information transferred so that the duration of the stop element is equal to one of a plurality of predetermined durations which correspond respectively to $n$ parts of the remainder of the regular duration of the stop element except the minimum duration which is determined to secure the normal reception of the stop element and wherein $n$ is a positive integer.

2. A system according to claim 1, in which said last-mentioned means comprises means for providing control information representative of the number of stored bits in a serial register provided in said serial-parallel signal converter, and in which said parallel-serial signal converter time-divisionally determines the duration of the stop element of each of the output characters in accordance with the control information and the number of sent-out elements of the sending-out characters.

3. A system according to claim 1, in which said last-mentioned means comprises means for providing control information representative of the number of empty bits of a serial register provided in said serial-parallel signal converter, and in which said parallel-serial signal converter time-divisionally determines the duration of the stop element of each of the output characters in accordance with the control information and the number of elements of the output characters.

* * * * *